United States Patent
Hession et al.

(10) Patent No.: US 9,247,070 B2
(45) Date of Patent: Jan. 26, 2016

(54) METHOD OF OPERATING A CONTACT CENTER

(75) Inventors: Patrick Hession, Oranmore (IE); Arik Elberse, Knocknacarra (IE); John Costello, Co. Galway (IE); Owen Friel, Kildare (IE)

(73) Assignee: Avaya Inc., Basking Ridge, NJ (US)

( * ) Notice: Subject to any disclaimer, the term of this patent is extended or adjusted under 35 U.S.C. 154(b) by 1885 days.

(21) Appl. No.: 11/570,277

(22) PCT Filed: Jun. 9, 2005
(Under 37 CFR 1.47)

(86) PCT No.: PCT/GB2005/002288
§ 371 (c)(1),
(2), (4) Date: Feb. 11, 2008

(87) PCT Pub. No.: WO2005/122544
PCT Pub. Date: Dec. 22, 2005

(65) Prior Publication Data
US 2010/0077082 A1  Mar. 25, 2010

(30) Foreign Application Priority Data
Jun. 10, 2004  (GB) .................................. 0412888.0

(51) Int. Cl.
G06F 15/16 (2006.01)
H04M 7/00 (2006.01)
G06Q 30/00 (2012.01)
H04M 3/51 (2006.01)
H04M 3/523 (2006.01)
H04L 29/06 (2006.01)
H04M 3/42 (2006.01)

(52) U.S. Cl.
CPC ............. *H04M 7/006* (2013.01); *G06Q 30/016* (2013.01); *H04M 3/5191* (2013.01); *H04M 3/5237* (2013.01); H04L 65/00 (2013.01); H04M 3/42042 (2013.01); H04M 3/42093 (2013.01); H04M 3/42365 (2013.01); H04M 7/0006 (2013.01)

(58) Field of Classification Search
CPC ........................................................ H04L 65/00
USPC ........................................ 709/223; 455/435
See application file for complete search history.

(56) References Cited

U.S. PATENT DOCUMENTS

2003/0073440 A1* 4/2003 Mukherjee et al. ........... 455/435

* cited by examiner

*Primary Examiner* — Adnan Mirza

(57) ABSTRACT

Some known Contact Centers rely on a Network Level Router to determine which of a number of available Contact Centers should deal with a given contact. This decision is made by the NLR based on real time information provided by the Contact Centers. However, the format of such information is proprietary which means that the NLR must translate and collate this information. This invention seeks to use session initiation protocol (SIP) Presence for such information transfer which enables improved decision making and further enables additional functionality to be added to the Contact Center system. The invention provides a SIP enabled Contact Center (180, 190, 200) comprising a Contact Center server arranged to send SIP messages to one or more other SIP enabled nodes in a SIP communications network, said SIP messages comprising SIP presence information about the current state of the Contact Center.

23 Claims, 8 Drawing Sheets

METHOD OF OPERATING A CONTACT CENTER

FIELD OF THE INVENTION

The present invention relates to a method and apparatus for operating a Contact Center using SIP (Session Initiation Protocol) Presence information.

BACKGROUND TO THE INVENTION

Call centers are known in which incoming calls are routed to one of a plurality of agents. For example, the call center might provide help desk facilities for a particular group of products. Customers are able to call in and be allocated to an agent who has the necessary skills to deal with the customer's query. Each agent has one or more skills, for example, a particular agent has knowledge about sales for product X and about technical support for product Y. An incoming call is received and information from that call used by the call center, together with information about the agents, in order to route the incoming call to an agent with the appropriate skill. For example, an interactive voice response system (IVR system) may be used to find out what type of agent skill is required. Associated with each skill is a queue into which incoming calls are placed until an agent with that skill becomes available.

Contact Centers are also known which deal with other media types of call such as email, video, voice over Internet protocol, and others.

The terms "call center" and "Contact Center" as used herein are not intended to be restricted to situations in which telephone calls are made to the center. Other types of call or contact are also envisaged, such as email, fax, SMS, chat, web access, video access and any other suitable method of contact including conventional telephone calls and voice over internet protocol telephone calls. Similarly, the terms "call" and "contact" as used herein are not intended to be restricted to conventional telephone calls but include contacts made by email, fax, voice over IP and any other suitable medium.

FIG. 1 shows a schematic diagram of a known arrangement for Network Level Routing Contact Center Set-up. The system includes a user interface 10, which is traditionally a voice interface, (either traditional PSTN TDM based or via Voice over IP or from a Mobile Phone). The system includes a number of gateways, 20, 30, 40 which are the gateways between the user and the routing intelligence in the middle of the network and may be for example, an IP PBX, a wireless gateway or a PSTN gateway. The system further includes a Network Level Router (NLR) 50 (also referred to as a Pre-termination Router) and one or more Contact Centers 60, 70, 80.

When the user dials for Contact Center service, the gateways 20, 30, 40, either route the call onto the NLR 50 or they consult with the NLR to determine where the call should be directed to, (e.g. to which of the Contact Centers). In order to be able to determine which Contact Center is best to handle the call, the NLR gathers information from the range of possible Contact Center termination points, and this information is gathered in the form of real-time stats or real-time state information 100.

The NLR uses this gathered information to determine what the current wait time is in the Contact Center queue or which Contact Center has the Longest Idle Agent. It may be application dependent as to what criteria the NLR uses to pick the best Contact Center for this call.

Once the NLR has made the determination and selected the Contact Center which is most appropriate to the call, the call is routed either through the NLR or redirected at the Gateway to the "best" Contact Center for this call 120.

The customer is then connected to the Contact Center where they receive the normal queueing treatment etc. before they get connected and are able to speak to a Contact Center Agent.

Alternatively the customer's call 90 can be queued at the network-level by the NLR 50 until using the state information 100 the NLR determines that an agent is available at one of the Contact Centers 60, 70, 80. The NLR would then complete the call 120 to the appropriate Contact Center and the customer would be directly connected to an available agent within that Contact Center.

These methods have the benefit that the NLR can optimise the usage of the Contact Centers by Load Balancing (sharing calls between each Call Center in an intelligent manner based on who is busiest). Furthermore, if the NLR application is to find the shortest wait time for the caller (as opposed to the Longest Idle Agent) then the caller may also receive benefits in that their queuing time is optimised.

However, the NLR is likely to have to select between a number of Contact Centers and these Contact Centers are likely to be provided by different manufacturers. This causes difficulties for the NLR because the nature of the Real Time Feed 100 is proprietary to the Contact Center vendor and therefore the NLR must act as a gateway to collate and unify this information from disparate sources and in different formats. Often this also requires the placement of proprietary gateway/normalization equipment (not shown in FIG. 1) at each of the Contact Centers whose function it is to interface with the local Contact Center, normalize its real-time information and interface the normalised real-time information 100 to the NLR.

OBJECT TO THE INVENTION

The invention seeks to provide an improved method and apparatus for operating a Contact Center.

The invention further seeks to provide a method and apparatus for operating a Contact Center which is arranged to handle both voice and non-voice contacts.

Further benefits and advantages of the invention will become apparent from a consideration of the following detailed description given with reference to the accompanying drawings, which specify and show preferred embodiments of the invention.

SUMMARY OF THE INVENTION

Some known Contact Centers rely on a Network Level Router to determine which of a number of available Contact Centers should deal with a given contact. This decision is made by the NLR based on real time statistics or events (state information) provided by the Contact Centers. However, the format of such information is proprietary which means that the NLR must translate and collate this information. This invention seeks to use SIP Presence for such information transfer which enables improved decision making and further enables additional functionality to be added to the Contact Center system.

According to a first aspect of the invention there is provided a session initiation protocol (SIP) enabled Contact Center comprising a Contact Center server arranged to send SIP messages to one or more other SIP enabled nodes in a SIP communications network, said SIP messages comprising SIP presence information about the current state of the Contact Center.

One of the benefits of this solution is that nodes and Contact Centers are using a standards based solution to optimise the usage of the Contact Centers by Load Balancing (sharing contacts between each Contact Center in an intelligent manner based on who is busiest).

The SIP presence information can be sent to a Network Level Router which is responsible for routing contacts between a plurality of possible Contact Centers. Alternatively, a Contact Center can send SIP presence information to other Contact Centers. This is particularly useful in networks where Contact Centers decide between themselves which Contact Center should accept a contact. Advantageously, the SIP presence information supplied by the Contact Center, or a sub set of the information, can be made available to end users who will make use of the Contact Center. This allows an end user to establish how long a Contact Center is likely to take to respond to a contact.

The SIP messages may comprise SIP presence information about the current state of one or more Contact Center agents associated with said Contact Center.

The SIP presence information may further comprise one or more of: time in queue information (such as longest queueing contact), estimated wait time, longest idle agent time, least busy agent and number of free agents.

The SIP presence information may further comprise information on the contact media type (e.g. voice call, Instant Message, email).

This enables decisions on a per media level of granularity as well as on a general Contact Center availability regarding which is the best Contact Center to handle the call.

Using SIP Presence further means that the system is more extensible in terms of the ability to define and leverage new types of Contact Center Real Time Status.

According to a second aspect of the invention there is provided a method of operating a session initiation protocol (SIP) enabled Contact Center, comprising the steps of: sending, from a Contact Center server, SIP messages to one or more other SIP enabled nodes in a SIP communications network, said SIP messages comprising SIP presence information about the current state of the Contact Center.

The one or more other nodes may comprise a Network Level Router or other Contact Centers.

According to a third aspect of the invention there is provided a communications network, at least part of which is session initiation protocol (SIP) enabled, comprising: a plurality of SIP enabled Contact Centers each being arranged to issue SIP messages comprising SIP presence information about the current state of the Contact Center issuing the SIP presence information; and one or more servers arranged to route incoming contacts to one of said Contact Centers on the basis of the SIP presence information.

The one or more servers may comprise a Network Level Router.

The one or more servers may be the Contact Center servers of the Contact Centers themselves.

The network may further comprise a presence server arranged to receive said issued SIP messages.

According to a fourth aspect of the invention there is provided a session initiation protocol (SIP) enabled Contact Center for issuing outbound contacts to end users comprising a Contact Center server which is arranged to receive SIP messages comprising SIP presence information about the current state of end users and which is further arranged to issue an outbound contact to the end users on the basis of the SIP presence information.

Using SIP presence information about the current state of end users has the advantage that the Contact Center can direct efforts towards contacting end users that it knows are, or are more likely to be, contactable. This can significantly reduce the amount of time that call center agents spend dealing with outbound contacts that are either unanswered or are answered by an answering machine or fax machine.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying Figures in which.

DETAILED DESCRIPTION OF INVENTION

Figure 1:
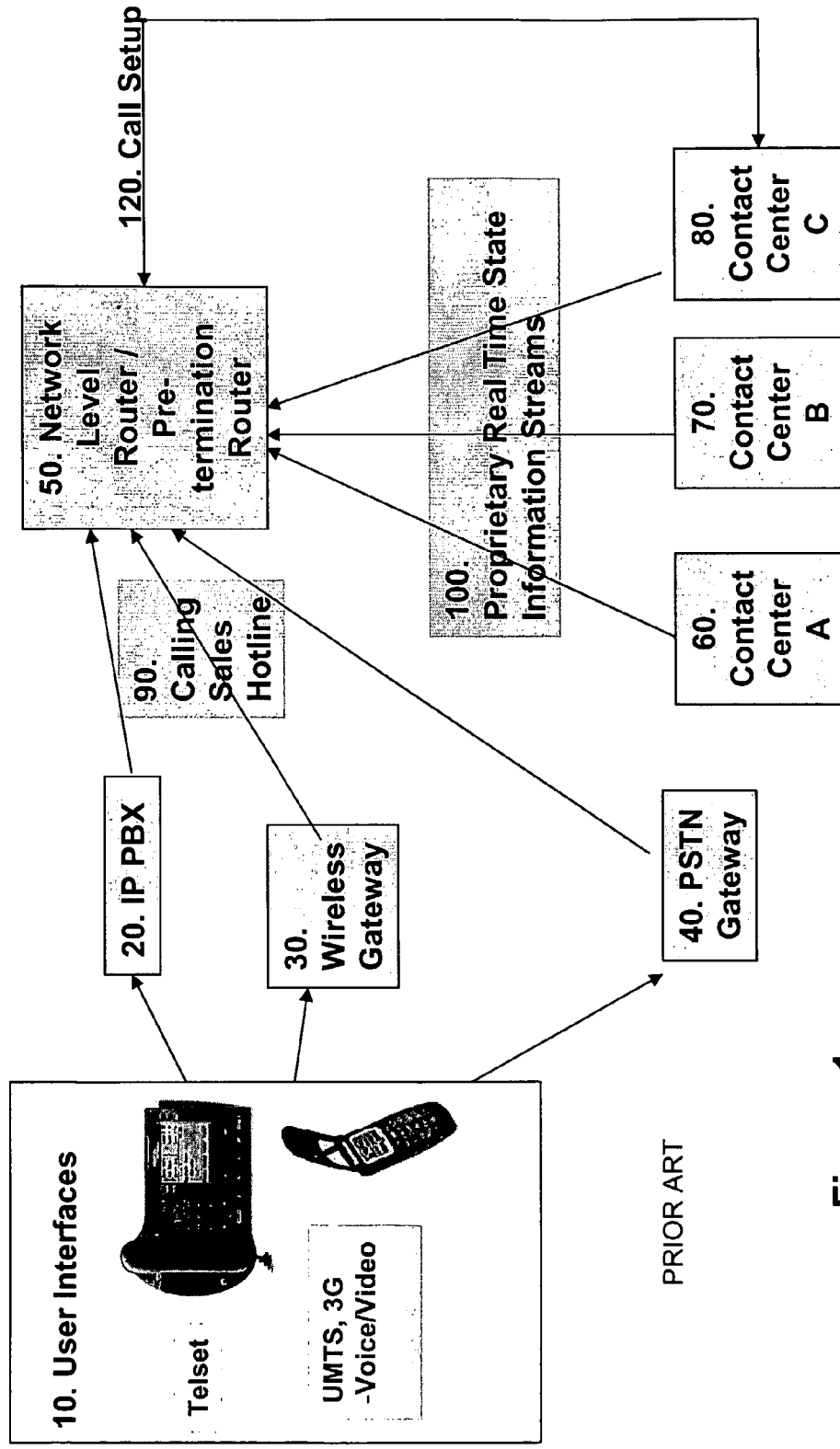
FIG. 1 is a schematic diagram of a known arrangement for Network Level Routing Contact Center Set-up.

Embodiments of the present invention are described below by way of example only. These examples represent the best ways of putting the invention into practice that are currently known to the Applicant although they are not the only ways in which this could be achieved.

As mentioned above, contacts are directed to a Contact Center by a Network Level Router (NLR). The routing may be done by the NLR or alternatively the NLR may just select which Contact Center the contact should be routed to, and the actual routing takes place elsewhere in the network. Currently this determination is made by the NLR based on real time information received from all the Contact Centers from which it can make a selection. Currently the format of the communication containing the information is proprietary to the Contact Center vendor.

According to this invention, it is proposed that the emerging concept of Presence (or published user availability information) is used in providing data relating to the Contact Centers to the NLR to enable it to make the required determination. Instant Message services over the internet which provide presence services, such as MSN Messenger™, Yahoo Messenger™ etc are becoming well-known and they allow users to determine if the person that they wish to contact is online or not, such that they can determine in advance whether the likelihood of successful communication is high.

Users can register their interest in the presence or availability of another subscriber (often known as a Buddy) and users can also decide whether they would like to hide their presence state or not by blocking publishing of their status to the wider community or even to individuals within the community.

The concept of presence currently only applies to sharing of information between users. However, this invention extends the concept to the sharing of information between machines, which enables the presence information to be used to improve or optimise automated processes.

Standardisation of Presence has been happening in the IETF with the SIP (RFC3261) community concentrating on this aspect of communications in particular. The present invention is described in relation to a SIP Enabled NLR and SIP Enabled Contact Centers and using the SIP Presence standards. However, the invention can also be applied to other standardised Presence protocols. An overview of SIP and a SIP Enabled Contact Center is provided below.

The concept of configurable Presence ("I am on the phone", "I am in the shower") is very powerful and has many far-reaching applications in PC to PC communications and even into such things as Mobile ("I am currently in France") or E911 ("I am in Building A, Floor 2"). So much so that there are several emerging draft standards in the SIP community such as the PUBLISH SIP Extension (draft-ietf-publish-03.txt) which are attempting to standardise the way the users can share and consume Presence.

As known in the art, SIP is a protocol that can be used to set up communication sessions over a packet data network where those communication sessions are for voice, video, instant messaging (IM) or other suitable media. This is often referred to as "voice over internet protocol" (VoIP) although the communication sessions are not limited to voice. A SIP enabled Contact Center is thus able to handle contacts received over a SIP data network and these may be of many different media types. SIP is defined in IETF RFC 3261, and other relevant SIP related IETF RFCs.

Figure 2:
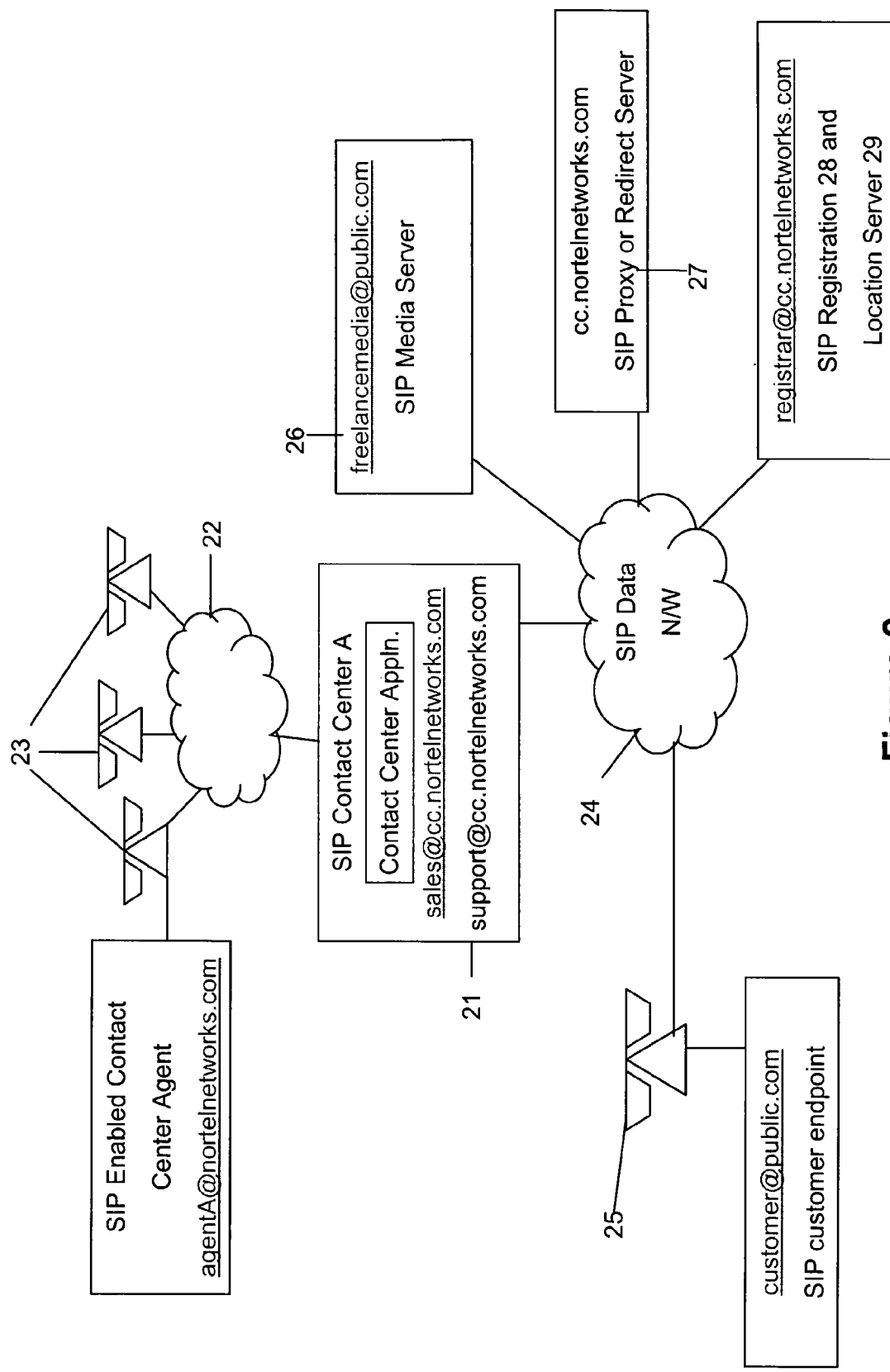
FIG. 2 is a schematic diagram of a SIP enabled Contact Center in a communications network.

FIG. 2 shows a schematic diagram of a SIP enabled Contact Center in a communications network in accordance with an embodiment of the invention. For reasons of clarity, only certain components of the SIP Contact Center and networks are shown in FIG. 2. Other components are used as known to the skilled person in the art.

The Contact Center comprises a server 21 running a Contact Center Application. The Contact Center is connected via a SIP data communications network 22 to a plurality of SIP enabled agent terminals 23. The communications network 22 can be an enterprise network that is connected to another data network 24 such as the Internet or a company-wide Intranet. The enterprise network 22 may be private with respect to the other data network 24 and in that case network address translators are used as known in the art.

The Contact Center server 21 acts to receive contacts from end users 25 connected to it via the SIP data network 24. These contacts are distributed to appropriate agents 23 by the entry system of the Contact Center server 21. The Contact Center optionally also uses a SIP media server 26 which is used to provide additional functionality for the Contact Center entry system. For example, this can be music-on-hold, recorded announcements or interactive voice response as known in the art. In FIG. 2 the media server 26 is shown as a physical block being a separate entity from the Contact Center server 21. However, this is not essential. A single server configuration can also be used in which the media server, Contact Center entry system, Contact Center server, SIP registrar and SIP proxy are provided using a single server. Thus the media server 26 as represented in FIG. 2 is either a physical or logical block. It is also possible for the media server 26 to be provided by a different party than that providing the Contact Center 21.

The SIP data network also comprises a SIP proxy or redirect server 27 and a SIP registration 28 and location 29 server as known in the art. Although only one of each of these items is illustrated others may be present in the data network 24. It is not essential for the SIP registration and location server to be provided at the same entity, these items may be separate as known in the art.

Any or all of the media server 26, proxy server 27, redirect server, registrar 28 and location server 29 may be provided by third parties. SIP Endpoints as represented by the Contact Center agent termination point could also be third party.

As mentioned above SIP is defined in IETF RFC 3261 and other RFCs and comprises various different types of entity including SIP endpoints, SIP registrars, SIP location servers and SIP proxy or redirect servers. The way in which these entities are applied in the present embodiment is now described.

SIP Endpoints

SIP endpoints for the purposes of this application are considered as intelligent stateful entities consisting of a SIP UAC (Client) and SIP UAS (Server). SIP endpoints can terminate or originate SIP sessions which can contain user to user information (e.g. Instant Messaging) or negotiation messaging to set up other parallel information streams (e.g. SDP). They can also terminate or originate Voice, Video or other multimedia messaging streams or redirect these streams to other entities as negotiated potentially via the Session Description Protocol (SDP) information transported over SIP. SDP is variously covered by RFC3264 and RFC2327.

In this embodiment SIP endpoints REGISTER their location as per RFC3261 with a SIP Registrar 28 and have an identified Proxy 27 or redirect server through which SIP sessions are passed for Address Resolution and other such functions. This can be extended to support static means such as configuration or other dynamic means (such as multicast to well known address).

SIP endpoint types for this architecture include: SIP Clients (the Contact Center Agent User Interface 23 and SIP customer endpoint 25); SIP Media Server 26 (the media and treatment response entity) and the SIP Contact Center server 21.

SIP Registrar 28

The SIP Registrar 28 is an entity to which the SIP endpoints send REGISTER messages to identify their current location in the data network 24. Generally the SIP Registrar 28 stores data in the location server (or is one and the same as the location server 29 as illustrated in FIG. 2). A further requirement of the SIP Registrar is generally to provide authentication services for the SIP user 25 (confirm user is configured and validates user password). Various authentication services are common including HTTP Digest (RFC2069 and RFC2617).

As explained in RFC3261 a register request can be used to add, remove and query bindings. A register request can be used to add a binding between one or more contact addresses and an address of record. A "SIP address of record" (AOR), as defined in RFC3261, is a SIP or SIP Universal Resource Indicator (URI) that points to a domain with a location service that can map the URI to another URI where the user might be available. Typically, the location service is populated through registrations. An AOR is frequently thought of as the "public address" of the user.

This registration process can be performed by a suitably authorised third party on behalf of a particular address of record. In the embodiment being described, the suitably authorised third party is the Contact Center server 21. It is also possible for a SIP client to remove existing bindings or query to find out which bindings currently exist for an address of record.

SIP Location Server 29

The location server 29 stores information that assists in resolving a User's Address of Record URI to an actual location that a User is currently Registered at. A SIP proxy or redirect server is able to input a URI to the location server and obtain details of any associated URIs to which to send a request. The information accessible to the location server is either obtained as a result of registrations made at the Registration Server or may be mapping functions configured at the direction of an administrator.

SIP Proxy or Redirect Server 27

This provides redirect or forwarding services for SIP sessions. If entity A wishes to initiate a session with entity B it can use SIP Proxies to resolve the location of the endpoint and move the request "closer" to entity B until such time as the Proxy nearest entity B presents the session directly to it.

SIP Media Server 26

This entity is not defined as part of the RFC3261 standard, but it is a generally accepted standard SIP endpoint in particular for Contact Centers.

SIP Presence Server 220

Figure 5:
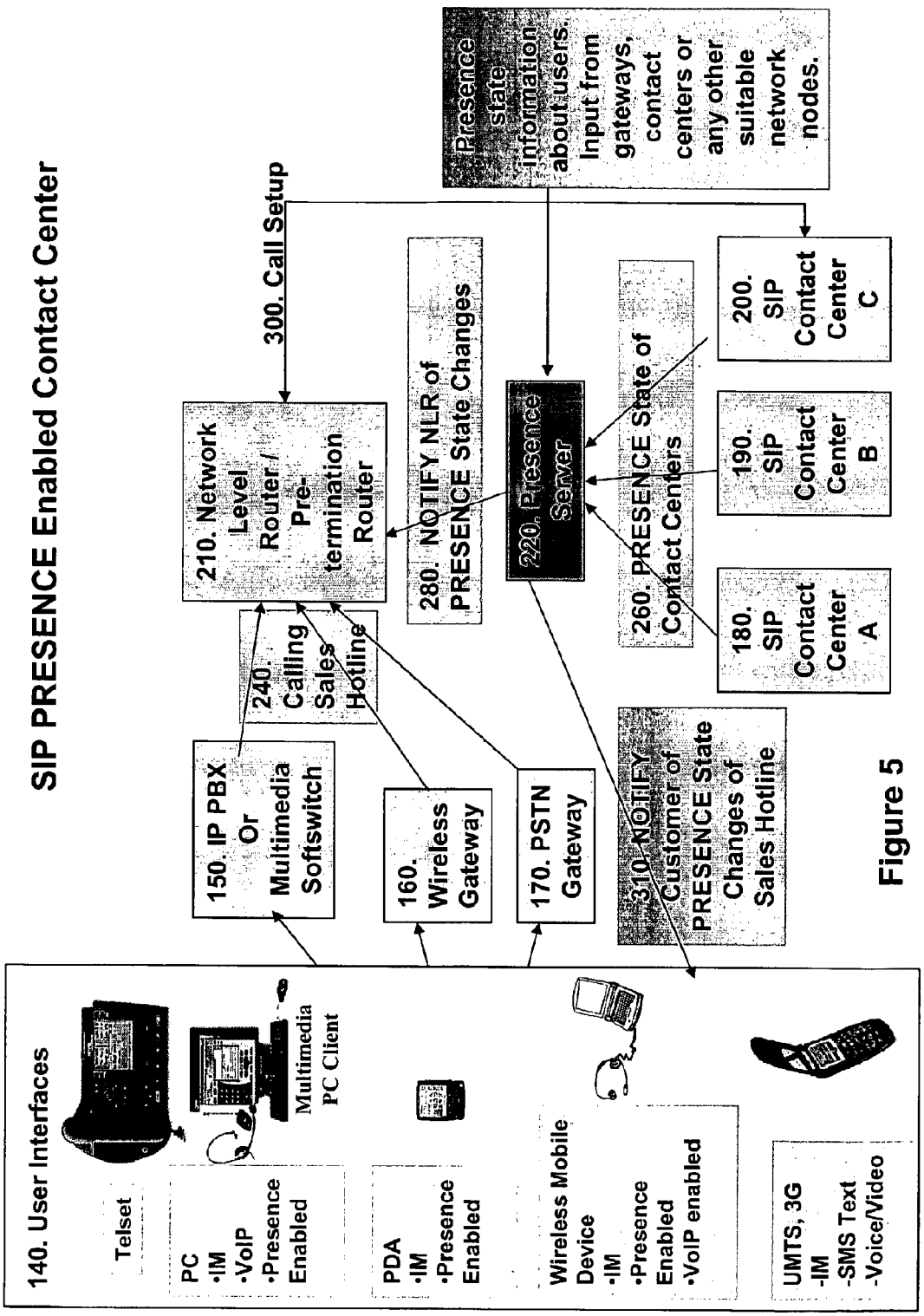
FIG. 5 is a schematic diagram showing an end user accessing SIP Presence information about a Contact Center.

This entity is not shown in FIG. 2, but is shown in later FIGS. 3 and 5. The entity accepts SIP PUBLISH sessions from end points who announce their current state (busy, away from desk, on the phone etc) and sends state updates to interested parties using SIP NOTIFYs.

A first embodiment of the present invention is described below with reference to FIG. 3 which shows a schematic diagram of a call center system using automated network level routing based on SIP Presence information, and a call flow diagram of FIG. 4.

The system includes a User Interface 140. The traditional interface of Voice (either traditional PSTN TDM based or via Voice over IP or from a Mobile Phone) is supported, but in addition new media such as Instant Messaging, SMS, Video and Email are also supported. The range of potential customer user interface devices has also been extended to entities such as PCs and multimedia enabled mobile devices.

Between the user and the routing intelligence in the middle of the network are emerging gateways 150, 160, 170. Each gateway may be an IP PBX, a wireless gateway, a PSTN gateway or other gateway type. In some cases these gateways will support SIP all the way to the customer user interface (and the solution is therefore end to end SIP) but this is not essential to the embodiment or the invention as a whole.

The system includes a SIP PRESENCE enabled Network Level Router (eNLR) 210. When the user contacts for Contact Center service, the gateways either route the call onto the eNLR or they consult with it to determine where the call should be directed to. In order to be able to make such a determination, the eNLR must gather information from the range of possible Contact Center termination points, (Contact Centers 180, 190, 200, which are SIP Enabled). The eNLR 210 subscribes to receive SIP Presence information about each Contact Center. One such subscription request is shown as step 401 in FIG. 4.

The eNLR gathers information on the various Contact Centers via a SIP Presence Server component 220. This SIP Presence Server can be a separate entity to the eNLR 210 or can be an integrated part of it.

There may also be multiple SIP Presence Servers 220; for example, one for each of the Contact Centers 180, 190 & 200.

Additionally the eNLR 210 may also have its own SIP Presence Server 220 and hence there may be federation (authenticated and authorised interoperability) between these various SIP Presence Servers, especially from the SIP Contact Centers to the eNLR.

The PRESENCE Server 220 receives SIP Presence information 260 via SIP PUBLISH or other SIP methods. Step 402 of FIG. 4 shows SIP Presence information being published to the Presence Server 220. The SIP PUBLISH defines the current state of the SIP Contact Center application such as: sales@cc.nn.com:Time_In_Queue=10 mins, "deals@cc.nn.com:Estimated_Wait_Time=10 mins" or "support@cc.nn.com:Longest_Idle_Agent=2 mins". The term "Time_In_Queue" means the time that the longest contact has been queuing and gives an indication of how busy the Contact Center is. Other state information that can be published is: "Least_Busy_Agent" and "Number_of_Free_Agents". The transport for these messages is SIP—a standardised solution ideally using draft-ietf-publish-03.txt emerging standard or whichever variance of this is eventually standardised.

As described above, the eNLR registers with the Presence Server to indicate interest in the information pertaining to the Contact Centers and therefore this information is provided to the eNLR by the Presence Server.

As SIP is simply a transport layer, the SIP PRESENCE information can be used to define media specific PRESENCE as more and more media types are added to the solution e.g. "sales@cc.nn.com:Time_In_Queue_Voice=10 mins;
Time_In_Queue_IM=1 min; Time_In_Queue_SMS=30 sec; Time_In_Queue_EMail=2 hrs"
Or "support@cc.nn.com:Longest_Idle_Agent_Voice=2 mins;
Longest_Idle_Agent_Video=10 mins".

By dividing out the presence information to this level of granularity, it enables the eNLR to make better decisions for each contact which it receives.

The SIP Presence flow is as follows:

User 140 makes a call to 1800-Sales or Sales@cc.nn.com if the user is fully SIP Enabled.

Figure 4:
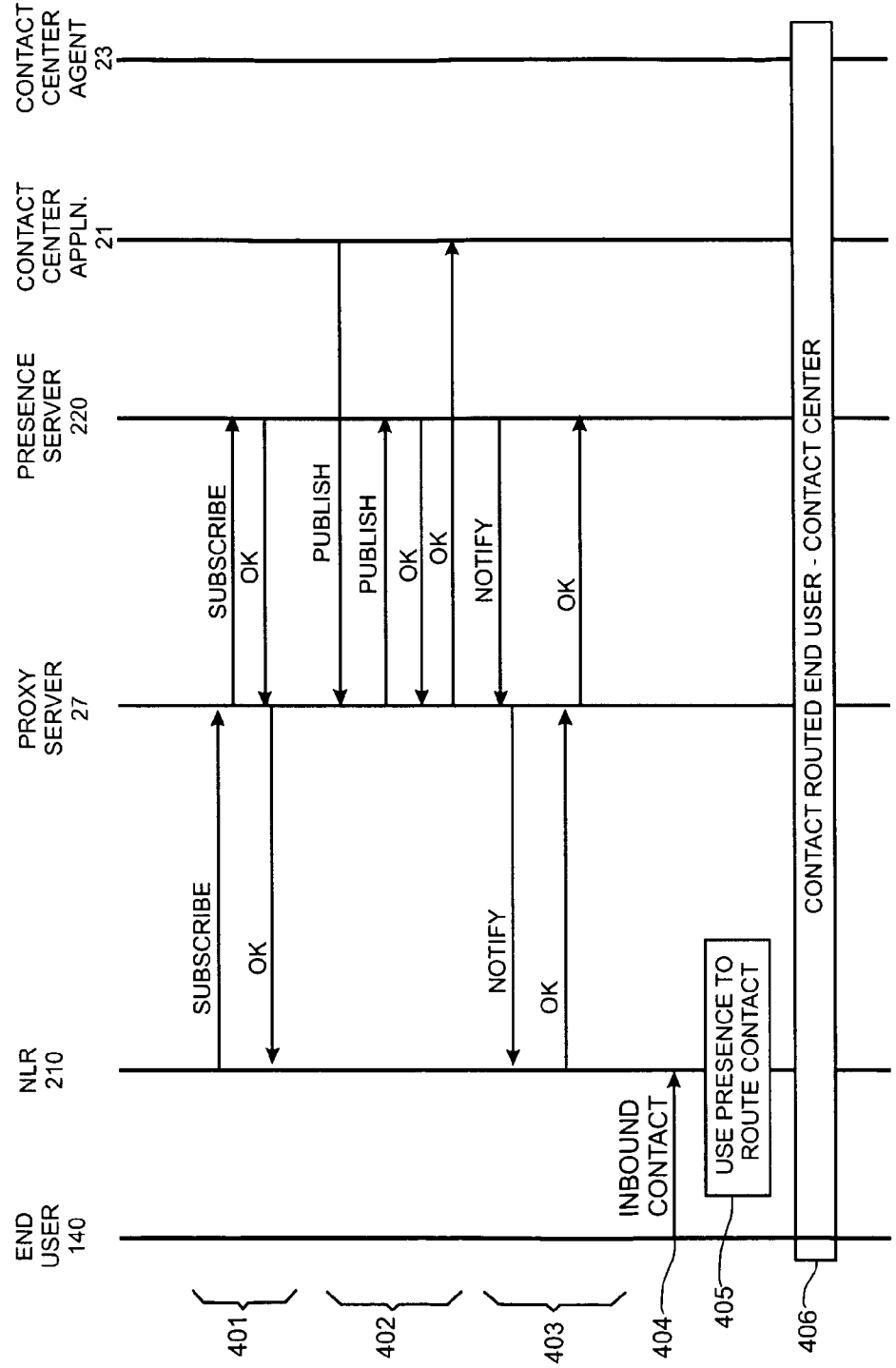
FIG. 4 shows a call flow for automated network level routing based on SIP Presence information.

The gateways 150,160,170 pass the call onto to the eNLR (or consult with the eNLR) to determine how the call should be routed 240 (step 404, FIG. 4).

The eNLR has been receiving SIP Presence information from the collection of possible Contact Centers via the SIP Presence Server 220 (one such message shown as step 403).

The eNLR uses this SIP Presence information to decide how to route the call at step 405.

The call is routed (either through the eNLR or redirected at the Gateway) to the "best" Contact Center for this call 300 at step 406.

When the customer gets connected to the Contact Center they will receive the normal queuing treatment etc. before they get connected to a Contact Center Agent.

In an alternative embodiment the user's call 240 might be queued by the eNLR 210, and given treatment by a SIP Media Server, and only forwarded to a Contact Center 180, 190, 200 when an appropriately skilled agent becomes available. The availability of suitable agents would be determined using the SIP Presence mechanisms described (e.g. when Presence information published by support@cc.nn.com indicates that Number_of_Free_Agents>=1.

One of the benefits of this solution is that the eNLR 210 is now using a standards based solution to optimise the usage of the Contact Centers by Load Balancing (sharing contacts between each Contact Center in an intelligent manner based on who is busiest).

Furthermore, by using Presence information related to each different media type, the eNLR can deliberate on a per media level of granularity as well as on a general Contact Center availability which is the best Contact Center to handle the call.

Using SIP Presence further means that the system is more extensible in terms of the ability to define and leverage new types of Contact Center Real Time Status.

The invention described extends into the multimedia space naturally by using SIP.

This embodiment also has the added advantage that if SIP enabled, the eNLR can retract an offered SIP call 300 by sending a SIP CANCEL method and redirect a call to another SIP Contact Center if for example the call has not yet reached an agent on the originally targeted Contact Center and if a dramatic change in queue time suddenly occurs in another Contact Center (e.g. a Contact Center shift starts).

Figure 3:
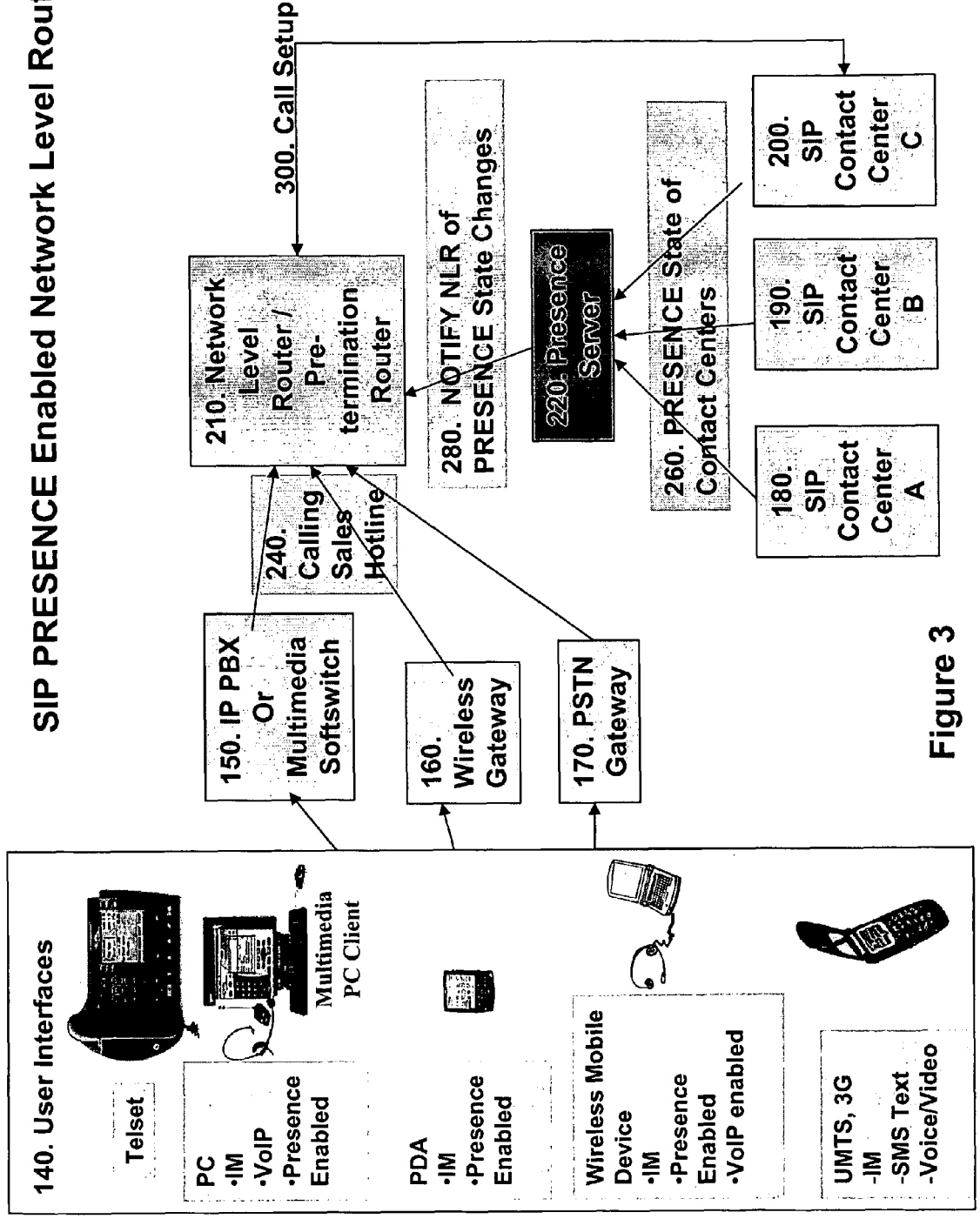
FIG. 3 is a schematic diagram of a call center system using automated network level routing based on SIP Presence information.

Although FIG. 3 shows the eNLR receiving presence information on each of the Contact Centers 180, 190, 200, the eNLR could alternatively, or in addition, receive presence information on individual Contact Center agents. This would enable the eNLR to make determinations on the routing of contacts at a lower level of granularity which may be beneficial in some cases, for example if there is a scarcity of Contact Center agents with a particular skill. This information could be channelled to the presence server directly from the Contact Center agents or via the Contact Centers to which they are associated.

In order to obtain information on individual Contact Center agents, the eNLR may need to register for this information with the Presence server on an agent by agent basis. Alternatively, the eNLR may automatically be provided with the information relating to all Contact Center agents associated with a Contact Center that it has registered an interest in.

Figure 6:
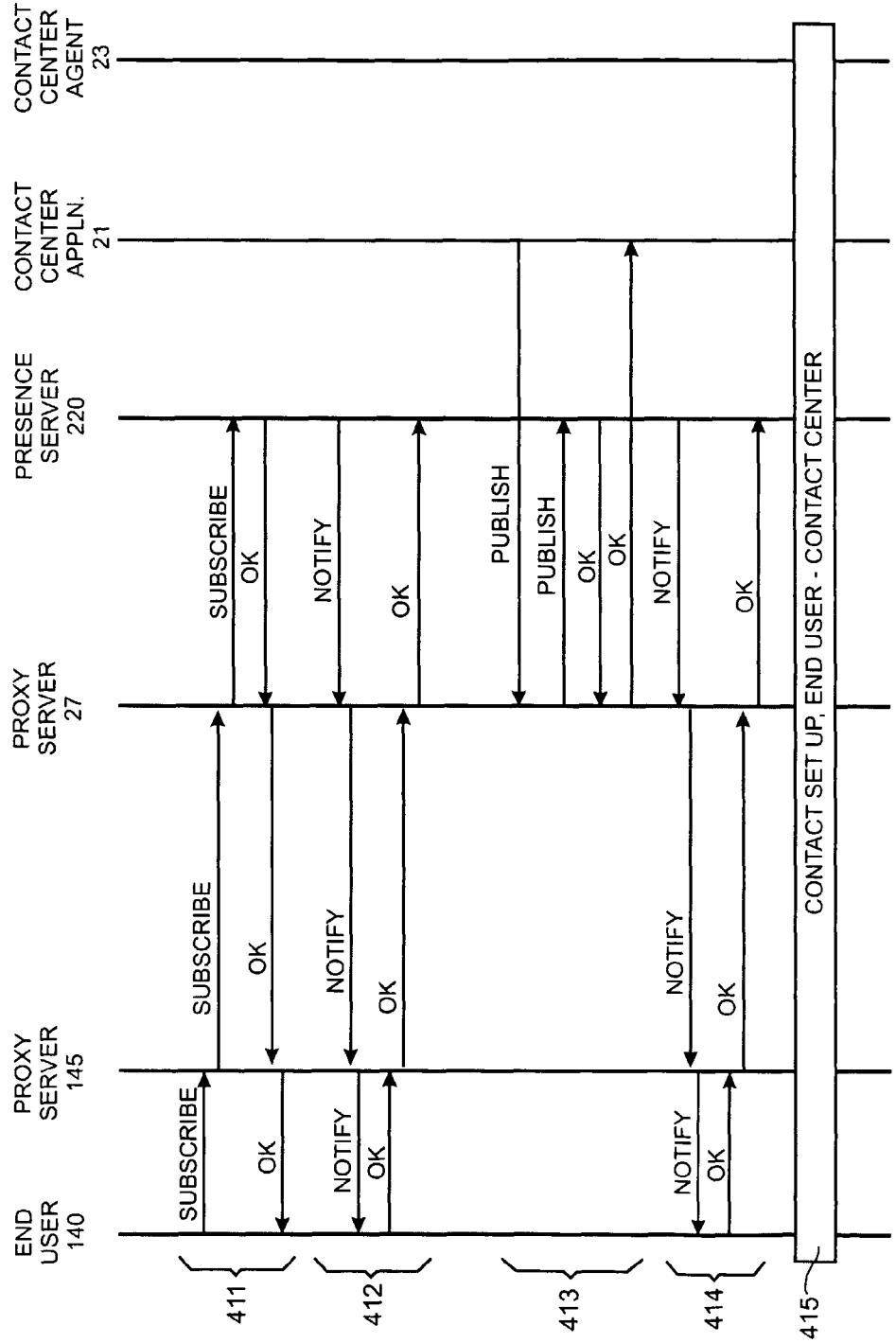
FIG. 6 shows a call flow for a situation where an end user accesses SIP Presence information about a Contact Center.

A second embodiment of the present invention is described below with reference to FIG. 5, which shows a modified version of the schematic diagram of a call center system shown in FIG. 3, and FIG. 6, which shows a more detailed SIP call flow. Common reference numerals have been used where appropriate and the following description relates only to the additional features of FIG. 5.

The second embodiment delivers the SIP Contact Center Presence information to the customer via the inclusion of the SIP NOTIFY message at 310. In this case the customer (if SIP enabled) can register with the SIP PRESENCE Server 220 as an interested party for Contact Center state (as the eNLR did, as described above). For example the user may register for presence information published by the URI sales@cc.nn.com. In step 411 the user 140 subscribes with Presence server 220 to receive presence information about the Contact Center. In the normal manner, the 'Subscribe' message is forwarded via a proxy server 145 local to the end user 140 and a proxy server local to the presence server 220. The 'Subscribe' request is acknowledged.

Once registered the user will receive information relating to the state of the Contact Center in a similar manner to which the eNLR receives this information, (as described above in relation to FIG. 3). The user may receive the same information as is provided to the eNLR or alternatively may receive a sub-set of the information, for example where some of the information provided to the eNLR is for internal use only and is not appropriate to be shared with the customers of the Contact Center. The provision of different sets of Presence information can be achieved by filtering at the Presence Server 220, based on the requesting party, or by allocating multiple SIP Uniform Resource Indicators (URIs) to the Contact Center. Each URI can publish a different set of Presence information. One URI, which publishes more detailed information, is made available to the eNLR while another URI, which publishes more restricted information, is made available to a wider audience, such as End Users.

Step 412 shows the end user receiving Presence information via a 'Notify' message from the Presence Server 220, which the End User 140 acknowledges. This presence information is automatically available to the user once they have registered, without the need for them to contact the Contact Center first. This is beneficial to the user as they do not incur the expense or inconvenience of contacting the Contact Center only to find that the expected wait time is very long.

For example, the user may receive the following information:

"sales@cc.nn.com:Estimated_Wait_Time=10 mins; Time_In_Queue_IM=1 min; Time_In_Queue_SMS=30 sec; Time_In_Queue_EMail=2 hrs"

As a result the user now has the ability to filter his or her activities because they actively know the likely wait time before they make the call.

For example, as a result they may opt to ring later when the Estimated Wait Time for the service has reduced. Alternatively, if the user has the appropriate technology, the user could select to use an alternative media type such as instant messaging or SMS to contact the Contact Center, when the user would expect a fast response, rather than emailing sales@cc.nn.com where the response time is significantly longer.

As described above in relation to the first embodiment, the presence information may be provided at a lower level of granularity and this may benefit the user if passed on. For example, a Japanese speaker could register with the Presence server to receive specific information relating to availability of agents speaking Japanese (either the actual wait time to speak to such an agent or at a higher level, whether such an agent is working at the time). The presence information sent to the user could then be tailored to their particular requirements enabling the user to determine when the optimum time for them to call is (e.g. they can avoid calling when there are no Japanese speaking Contact Center agents available or alternatively when there are no Japanese speaking Contact Center agents working).

At step 413 a Contact Center Application notifies the Presence Server 220 of a change in state of the Contact Server by issuing a 'Publish' message, which is acknowledged. The Presence Server notifies all parties that have requested presence information about the Contact Center, including the end user 140 at step 414. When the Presence information received at step 414 indicates that the Contact Center is available, the End User attempts to set up a contact to the Contact Center at step 415 via a desired medium.

This embodiment has significant benefits, including:
  Customer satisfaction—the user will not have to wait for extended periods of time queuing for an Agent
  Customer flexibility—the user may have been about to make a voice or video call, but can now decide to change media to use IM or SMS where the service turnaround time is quicker.
  Contact Center load balancing—the number of calls spending long periods of time in the queue should naturally reduce as the customer drives optimisation of how and when the Contact Center is used. This could potentially see improvements in terms of front end service equipment. For example if the average queuing time is shortened overall because of customer front end choice the equipment investment for supplying music and pre-treatment should in theory also reduce.

Load Balancing across media—all media usage in the Contact Center will potentially be optimised. This will occur as users opt to use a media where the wait time is shorter.

Contact Center cost reduction—the load balancing described above will help drive staffing efficiencies and will reduce average queue time on free-phone numbers thus reducing the call charges incurred by the Contact Center.

A third embodiment of the invention relates to an Outbound Contact Center application (compared to the first and second embodiments which discussed inbound contacts from the user into the Contact Center).

Outbound Contact Centers are typically used in marketing campaigns where lists of numbers are programmed into a predictive outbound dialler. Outbound contacts can include media types other than just voice calls. The dialler interacts with the Contact Center to reserve an agent. It then traverses through its list of dialled numbers attempting each number. As soon as a target number answers the call is connected to the agent.

Alternatively the outbound campaign could be implemented as a preview or progressive dialling campaign as is known in the art. In this case a number from the list of numbers to dial is presented to an available agent and the call is either manually (preview) or automatically (progressive) dialled from the agents desktop/phone. The agent is responsible for manually detecting whether the dialled number is valid, busy or not and whether the call is answered by a live person or an answering machine or fax machine. Any numbers which are not answered by a live person are a waste of the Contact Center's resources.

With SIP Presence enhancements, the predictive outbound dialler and/or the outbound campaign manager/outbound contact queue (i.e. the entity that decides which numbers are to be dialled/presented to an agent next) can leverage Customer SIP Presence information to filter it's outbound number list, so that it only tries those numbers whose presence information indicates that they appear IDLE or AVAILABLE and are therefore more likely to respond. Alternatively, the dialler could call Customers whose Presence information suggests they are online as this would suggest that they are more likely to be contacting premises (e.g. houses) where the occupants are actually there. This can save time that would be otherwise be wasted by having agents dialling or manually detecting whether a live person answers a call.

Such Presence information relating to the numbers dialled may be available for many reasons, for example, the dialled number may belong to a user of the Contact Center, or belong to a customer of a company associated with the Contact Center (e.g. the Contact Center may be associated with a telecommunications service provider and so presence information may be available for all that service provider's customers). Other techniques will be known in the art.

The end user presence information can either be received by and coordinated by the presence server 220 as indicated in FIG. 4 or it can be received and shared between the actual Contact Centers.

This has significant optimisations in that resources and time are only used where there is a higher probability of successfully having a contact answered.

Figure 7:
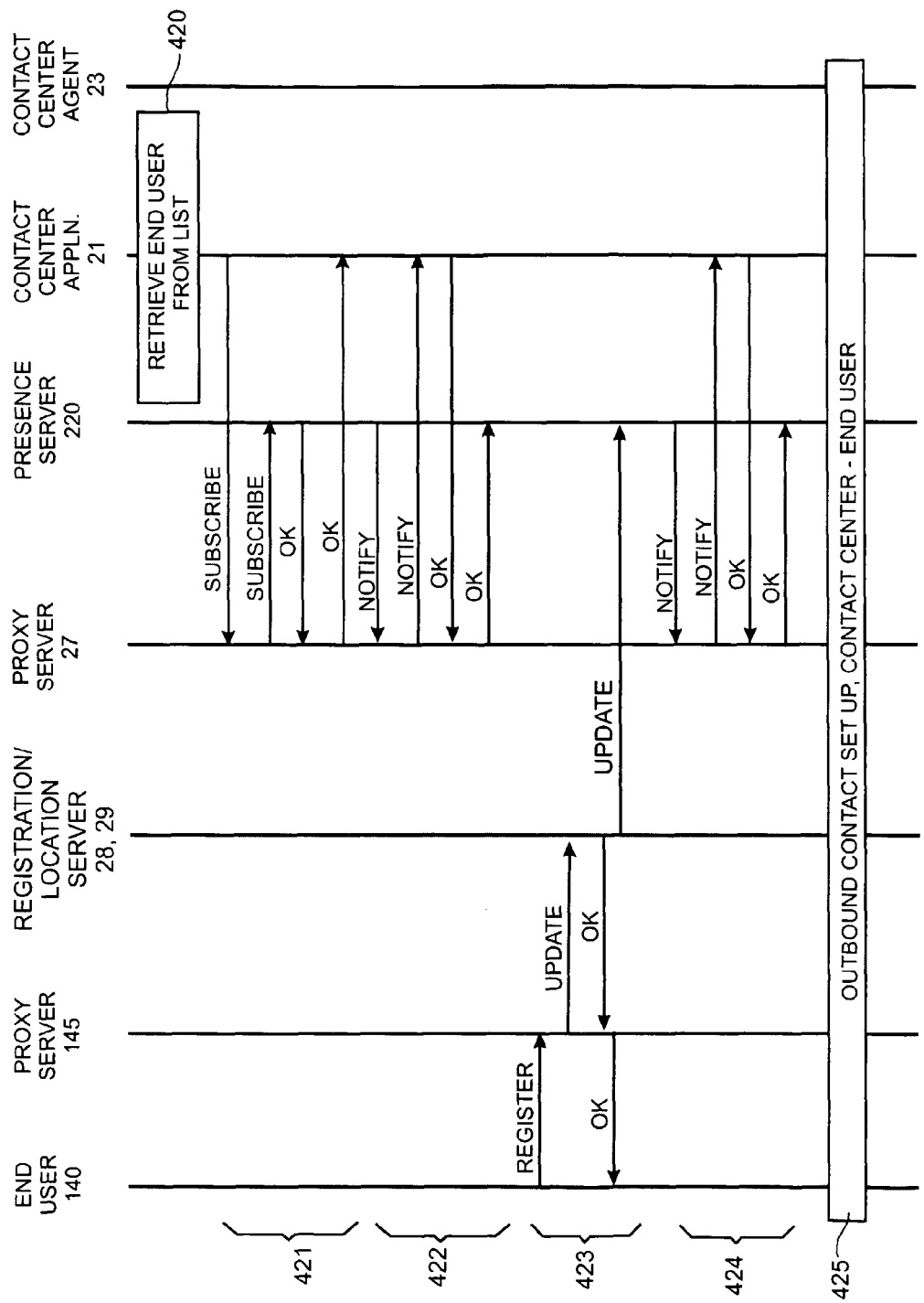
FIG. 7 shows a call flow for a situation where a Contact Center accesses SIP Presence information about an end user for use in an outbound Contact Center application; and, FIG. 8 shows a call flow for a situation where a Contact Center accesses SIP Presence information about an end user for use in making a contact back to an end user.

FIG. 7 shows a call flow between network entities for this embodiment. At Step 420 A Contact Center Application 21, responsible for an outbound dialling campaign, retrieves details of an end user that it is desired to contact. At step 421 the Contact Center Application 21 subscribes with Presence server 220 to receive presence information about the end user 140. The request is acknowledged. The Contact Center Application 21 begins to receive messages from the Presence Server 220 conveying Presence Information about the requested End User 140. One such message is shown at step 422. At step 423 end user 140 registers with the network and proxy server 145 forwards an update message to the Registration/Location Servers 28, 29. The Location Server 29 sends an 'Update' message to the Presence Server 220. This change to the Presence information is reported to the Contact Center at step 424 in a further 'Notify' message. As the Presence information received at step 424 indicates that the End User 140 is now available, the Contact Center Application 21 attempts to set up a contact, at step 425, between a Contact Center Agent 23 and the End User 140 via a desired medium.

Further information on Presence can be found in the following co-pending patent applications:

U.S. Ser. No. 09/460,781 filed 14 Dec. 1999 and published in Europe as EP 1 240 755

U.S. Ser. No. 09/460,556 filed 14 Dec. 1999 and published in Europe as EP 1 240 757

U.S. Ser. No. 09/461,654 filed 14 Dec. 1999 and published in Europe as EP 1 240 756

U.S. Ser. No. 09/460,677 filed 14 Dec. 1999 and published in Europe as EP 1 260 069

In a fourth embodiment the invention also relates to outgoing contact sessions from the Contact Center. These outgoing contacts may be due a number of reasons including: a request for a contact back initiated by the user (e.g. a request for a supervisor to contact them), a requirement for a contact back (e.g. if the original problem could not be addressed at the time) or a user satisfaction survey. A requirement for a contact back could be initiated by one of the options on a Contact Center menu system, for those users who cannot wait the required time for a Contact Center agent but instead would prefer the Contact Center agent to contact them and in order to achieve this the user would allow the Contact Center (or Contact Center agent) to access their presence information.

When a user contacts the Contact Center, a contact back from the Contact Center to the user may be required or desired. When the user makes the initial contact, the user authorises the release of their presence information to the Contact Center (or to the eNLR or to a specific Contact Center agent). This presence information may have an expiry time/date associated with it, in that the Contact Center may only be allowed to receive the presence information for a given period of time before authorisation is again required by the user. This means that a Contact Center agent who needs to contact back a number of users can maximise the likelihood of success of that contact back using the presence information that the Contact Center (or Contact Center agent or eNLR) has about that user.

This may be particularly important when embarking on a survey of Contact Center users as there may be a large list of users to contact. By maximising the success of every attempted contact by using the presence information of the users, a larger number of successful contacts are likely to be made in a given period.

Figure 8:
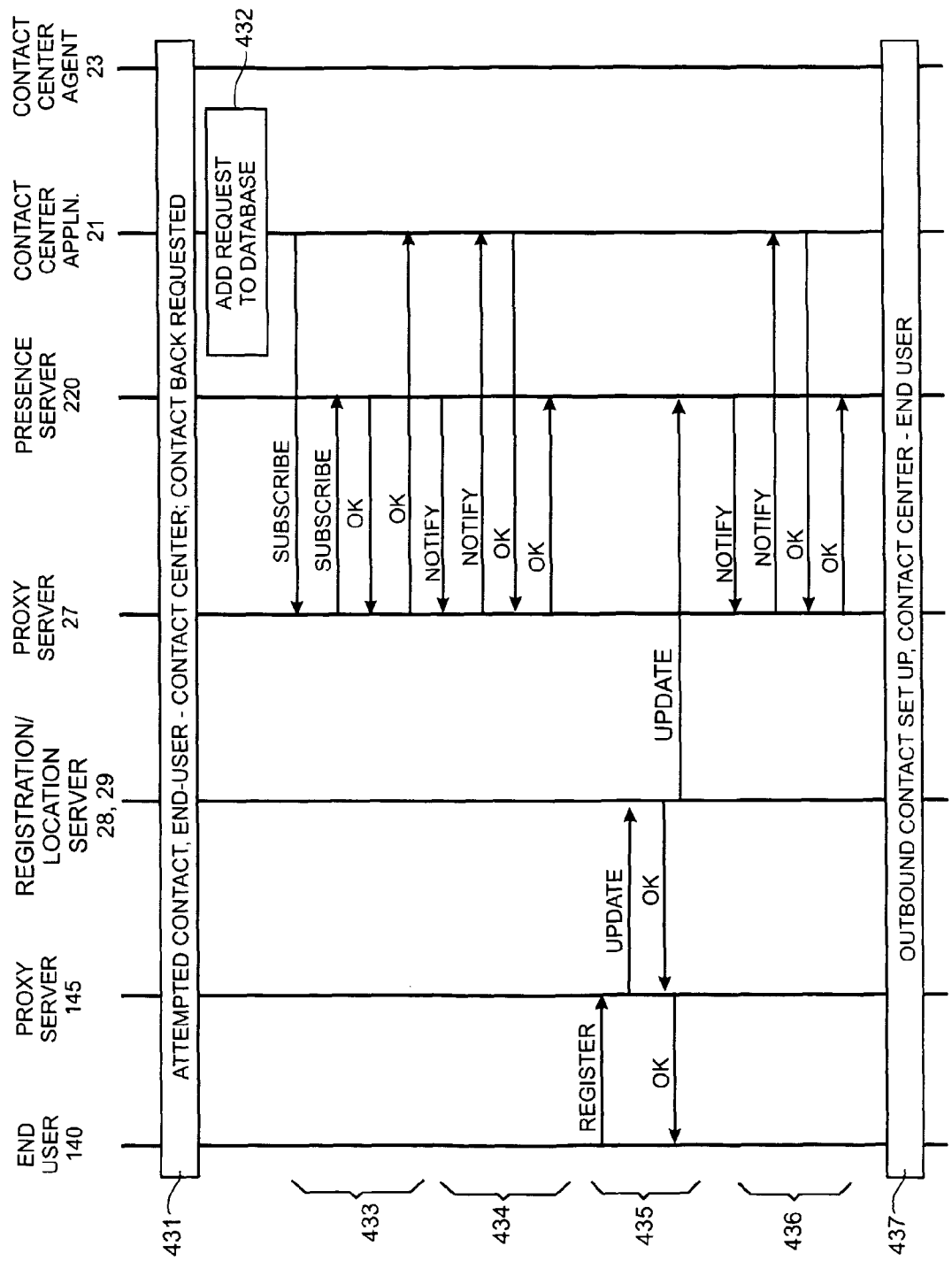

FIG. 8 shows a call flow between network entities for this embodiment. The call flow is similar to that shown in FIG. 7. In this embodiment at step 431 an End User 140 attempts to contact a Contact Center and decides to request a call-back from the Contact Center. At step 432 a contact-back request is added to the database held by the Contact Center Application 21. At step 433 the Contact Center Application 21 subscribes to receive Presence Information about the End User from Presence Server 220 and receives this information in 'Notify' messages, one of which is shown at step 434. When the End User becomes available, such as by registering with a proxy server 145, the Presence information about the End User is updated at step 435 and the Contact Center Application 21 is notified of the availability of the End User 140 at step 436. At step 437 the Contact Center Application 21 attempts to set up a contact between a Contact Center Agent 23 and the End User 140 via a desired medium.

In another embodiment it is not necessary to use a network level router 210. In this case presence information is shared amongst the individual Contact Centers and used by these individual Contact Centers to make network level routing decisions as required. Incoming contacts are directed to any one of the Contact Centers as specified by the end user. That receiving Contact Center is then able to either service the contact itself, or route the contact on to one of the other Contact Centers on the basis of the shared presence information and any other information it has relevant to network level routing. In a similar way, user presence information can be shared amongst the Contact Centers and used during outbound contact sessions.

In any of the embodiments described it is possible to use a reservation method as known in the art whereby a particular agent or place in a queue is reserved before routing a contact to that reserved agent or place in the queue.

The invention claimed is:

1. A session initiation protocol (SIP) enabled node in a SIP communications network, the SIP enabled node being arranged to:
    receive SIP messages from at least one SIP enabled Contact Center in the SIP communications network, said SIP messages comprising SIP presence information about the current state of the Contact Center;
    receive an incoming contact requiring routing to at least one of the SIP enabled Contact Centers for processing by an agent of the Contact Center;
    employ said SIP presence information to determine a SIP enabled Contact Center to which the incoming contact should be routed; and
    route the incoming contact to the determined SIP enabled Contact Center.

2. A SIP enabled node as claimed in claim 1, wherein said node comprises a Network Level Router.

3. A SIP enabled node as claimed in claim 1, wherein said node is a Contact Center.

4. A SIP enabled node as claimed in claim 1, wherein said SIP messages comprise SIP presence information about the current state of one or more Contact Center agents associated with said Contact Center.

5. A SIP enabled node as claimed claim 1, wherein said SIP presence information comprises one or more of: time in queue information, estimated wait time, longest idle agent time, longest queuing contact, least busy agent and number of free agents.

6. A SIP enabled node as claimed in claim 5, wherein said SIP presence information further comprises information on the contact media type.

7. A SIP enabled node as claimed in claim 1 which is further arranged to receive SIP messages comprising SIP presence information about the current state of end users and to issue outbound contacts to the end users on the basis of the SIP presence information.

8. A SIP enabled node as claimed in claim 1 which is arranged to queue waiting contacts and which can cancel a waiting contact on receipt of a SIP Cancel message.

9. A method of operating a session initiation protocol (SIP) enabled node in a SIP communication network, the method comprising the steps of:
    receiving, from at least one SIP enabled Contact Center server, SIP messages, said SIP messages comprising SIP presence information about the current state of the SIP enabled Contact Center;
    receiving an incoming contact requiring routing to at least one of the SIP enabled Contact Centers for processing by an agent of the SIP enabled Contact Center; and
    employing said SIP presence information to determine a SIP enabled Contact Center to which the incoming contact should be routed; and
    routing the incoming contact to the determined SIP enabled Contact Center.

10. A method of operating a SIP enabled node as claimed in claim 9, wherein the one or more other nodes comprise a Network Level Router.

11. A method of operating a SIP enabled node as claimed in claim 9, wherein the one or more other nodes are other Contact Centers.

12. A communications network, at least part of which is session initiation protocol (SIP) enabled, comprising:
    a plurality of SIP enabled Contact Centers each being arranged to issue SIP messages comprising SIP presence information about the current state of the SIP enabled Contact Center issuing the SIP presence information; and
    one or more servers arranged to receive incoming contacts requiring routing to at least one of the SIP enabled Contact Centers for processing by an agent of the SIP enabled Contact Center and to route the incoming contacts to one of said SIP enabled Contact Centers on the basis of the SIP presence information.

13. A communications network as claimed in claim 12, wherein said one or more servers comprise a Network Level Router.

14. A communications network as claimed in claim 12, wherein said one or more servers are arranged to redirect a contact which has been routed to, and is queued at, a first of the Contact Centers to a second of the Contact Centers.

15. A communications network as claimed in claim 12, wherein said one or more servers are the Contact Center servers of the SIP enabled Contact Centers themselves.

16. A communications network as claimed in claim 12, wherein the network further comprises a presence server arranged to receive said issued SIP messages.

17. A communications network as claimed in any claim 12 wherein at least part of the SIP presence information issued by a SIP enabled Contact Center is made available to end users of the SIP enabled Contact Center.

18. A communications network as claimed in claim 17 wherein the SIP presence information is stored at a presence server which receives and responds to requests for information about the state of the SIP enabled Contact Center.

19. A communications network at least part of which is SIP enabled comprising a plurality of SIP enabled Contact Centers each being arranged to receive requests for contact back from end users and issue outbound contacts to end users on the basis of SIP presence information about the current state of the end users, wherein the issuance of outbound contacts causes the establishment of a session between the SIP enabled Contact Centers and the end users.

20. A session initiation protocol (SIP) enabled Contact Center for issuing outbound contacts to end users comprising a Contact Center server which is arranged to receive requests for contact back from end users, and receive SIP messages comprising SIP presence information about the current state of the end users and which is further arranged to issue an outbound contact to the end users on the basis of the SIP presence information, wherein the issuance of the outbound contact causes the establishment of a session between the Contact Center server and the end users.

21. A method of contacting end users from a SIP enabled contact centre comprising:
    receiving a request for a contact back from an end user;
    receiving a SIP message comprising SIP presence information about the current state of the end user; and
    issuing an outbound contact to the end user on the basis of the SIP presence information, wherein the issuing of the outbound contact causes the establishment of a session between the Contact Center server and the end user.

22. A method according to claim 21 further comprising receiving an authorization to release that end user's presence information for use by the SIP enabled Contact Center.

23. A method according to claim 22 wherein the authorization to release that end user's presence information permits the SIP enabled Contact Center to access the presence information for a limited duration.

* * * * *